United States Patent
Oyama et al.

(10) Patent No.: US 6,329,099 B1
(45) Date of Patent: Dec. 11, 2001

(54) SODIUM-SULFUR BATTERY, AND A BATTERY SYSTEM USING SAME

(75) Inventors: Tetsuo Oyama, Takahagi; Tadahiko Miyoshi, Hitachi; Manabu Madokoro, Hitachi; Hisamitsu Hatoh, Hitachi; Shigeoki Nishimura, Hitachinaka; Katsuhiko Shiota, Tokai-mura; Kiyoshi Otaka, Takahagi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/270,678

(22) Filed: Mar. 16, 1999

Related U.S. Application Data (62) Division of application No. 08/680,851, filed on Jul. 16, 1996, now Pat. No. 5,962,160.

(30) Foreign Application Priority Data

Jul. 17, 1995 (JP) .................................................. 7-179787
Sep. 25, 1995 (JP) .................................................. 7-245759

(51) Int. Cl.[7] ...................................................... H01M 10/39
(52) U.S. Cl. ............................................ 429/104; 429/176
(58) Field of Search ....................................... 429/176, 104

(56) References Cited

PUBLICATIONS

R. Bauer, et al., "Some Studies On Sodium/Sulfur Cells", Journal of Power Sources, 1 (1976/1977) 2, pp. 109–126, (No Month).

Primary Examiner—John S. Maples
(74) Attorney, Agent, or Firm—Antonelli, Terry, Stout & Kraus, LLP

(57) ABSTRACT

A highly reliable sodium-sulfur battery includes a cell container for the positive electrode which is hardly deteriorated by corrosion. The cell container for the positive electrode is assembled by integrating plural members made of a high corrosion resistant alloy containing Cr, or a Co base alloy containing Cr, Ni and Mo, wherein carbide containing at least one of Cr, W and Mo is precipitated, and a readily deformable portion is provided to the cell container for the positive electrode, whereby reliability of the sodium-sulfur battery can be significantly improved.

18 Claims, 3 Drawing Sheets

SODIUM-SULFUR BATTERY, AND A BATTERY SYSTEM USING SAME

This application is a Divisional application of Ser. No. 08/680,851, filed Jul. 16, 1996, now U.S. Pat. No. 5,962,160.

BACKGROUND OF THE INVENTION

The present invention relates to a sodium-sulfur battery having a high reliability, which is suitable for composing battery systems such as power storage equipment, electric vehicles, emergency power supplies, uninterruptible power supplies, peak shift apparatus for electric power systems, frequency-voltage stabilizers, and others, and to a battery system using same.

A sodium-sulfur battery using sodium for the negative electrode and sulfur for the positive electrode active material receives a widespread attention, because of its preferable efficiency and a large energy density, and being expected to be useful for power storage systems, electric vehicles, and others. However, the sodium-sulfur battery has a problem that corrosive sulfur and sodium polysulfide cause corrosion of a cell container for positive electrode to deteriorate the characteristics of the battery, which becomes a barrier to be overcome in practical use. That is, the sodium-sulfur battery had a problem that, when surface of the metallic vessel composing the cell container for positive. electrode, which is made of metal such as stainless steel, is corroded by sulfur and sodium polysulfide. Sulfur, which is a positive electrode active material, is consumed for forming corrosion products, and the amount of the positive electrode active material necessary for the battery reaction is decreased to lower the battery capacitance. Further, there is another problem such that an effect of electrical resistance of metallic sulfide generated at the surface of the positive electrode increases an internal resistance of the battery to lower the efficiency of the battery. In order to solve the problem, various methods, wherein the inner wall of the cell container for positive electrode is coated with a corrosion resistant coating agent composed mainly of Cr, Mo, Ti, Al, C and so on, have been disclosed. However, because of peeling by thermal cycles and defects in the coating layer, reliability of the coating is not sufficient in comparison with a case when a bulk material is used for the cell container for positive electrode. For instance, JP-A-2-142065 (1990) discloses a cell container for positive electrode made of aluminum alloy, for instance, of which surface is coated with a cobalt base alloy film containing 20~40 wt. % Cr, 1~3 wt. % C, and others by a plasma spraying method. The above case, wherein surface of the cell container for positive electrode was coated with a corrosion resistant Co base alloy film, had problems such that the adhesion and durability of the coating film fluctuated readily because the manufacturing method was complex, and reliability was not sufficient because sometimes the coating film was peeled off during assembling the battery and operation. The coating alloy layer formed by the plasma spraying method readily absorbs gases generated from the molten metal, because the coating film is formed by solidification of the molten metal. The alloy layer has a danger to cause readily swelling or peeling off by partial pressure of the gases with a temperature rise during operation of the battery. Once the swelling or the peeling occurs, the cell container for positive electrode made of an aluminum alloy forms an insulating film by contacting with molten sodium polysulfide, and such a problem occurs that an efficiency of current collection from the cell container for positive electrode decreases. Further, when an aluminum alloy is used for fabricating the cell container for positive electrode, the carbon contained in the Co base ally layer formed by the plasma spraying method reacts with aluminum base material of the positive electrode with the heat at the plasma spraying to generate aluminum carbide ($Al_4C_3$). The carbide reacts with water in atmosphere to generate methane by a reaction shown with the following equation:

Therefore, handling of the cell container for positive electrode in atmosphere causes peeling off and deteriorating the alloy layer. Accordingly, consideration, such that an operation for assembling the cell container for positive electrode into the battery must be performed in an inert atmosphere, becomes necessary, and it is deemed as a disadvantage in view of mass production.

Once $Al_4C_3$ is generated, the alloy layer has a danger to cause peeling off by a stress generated by assembling or operating the battery because of brittelness of $Al_4C_3$. As examples of using a bulk metallic material for the cell container for positive electrode, various cases using Fe alloys containing a large amount of Cr were disclosed, for instance, in JP-A-59-165378 (1984), JP-A-57-57861 (1982), and JP-A-56-130071 (1981). In preparing a cell container for positive electrode with the above metallic material, welding is the most preferable method for finally sealing the cell container for positive electrode in reliability and operability. However, in accordance with welding by the prior art, the corrosion resistance of the material at the welding portion became worse than the bulk material. Accordingly, there was a problem that actual corrosion velocity of the cell container for positive electrode by sulfur and sodium polysulfide became faster than a value expected from a result of experimental corrosion test. As the result, a problem in reliability such as insufficient reliability of batteries, and in difficulty of life estimation because of change in corrosion resistant property depending on variation in welding conditions has been remained to be solved. Examples using welding for Fe group cell container for positive electrode were disclosed in JP-A-2-144858 (1990), JP-A-61-10881 (1986), and JP-A-48-43129 (1981). An corrosion resistance coating material was used for the cell container for positive electrode disclosed in JP-A-2-144858 (1990). However, the corrosion resistant property of the material at the welding portion decreased significantly by melting of the coating layer by the welding, and a low reliability of the battery was a problem to be solved. On the other hand, JP-A-61-10881 (1986) disclosed a positive electrode lid made of stainless steel, Fe—Cr—Al alloy, or Fe coated with Al, and a positive electrode supplementary lid made of stainless steel, Fe—Cr—Al alloy, or Fe—Cr—Al—Y alloy. However, the reference did not teach any material for the battery vessel, which was a key component of the cell container for positive electrode, nor any content of Cr and C of the Fe alloy composing the positive electrode lid, which was another key component of the cell container for positive electrode, and the positive electrode supplementary lid. In accordance with JP-A-48-43129 (1973), SUS 304 (Cr 18~20 wt. %, Ni 8~10.5 wt. %, Fe balance) was used as a material for the cell container for positive electrode. Although SUS 304 has a preferable weldability, a sufficient reliability can not be obtained because of poor corrosion resistant property against sulfur. The Fe alloy has a larger residual strain at the welding portion, and a smaller corrosion resistance in comparison with Co base alloy and Ni base alloy, and a specific resistivity of ferrous sulfide, which is a corrosion product of the Fe alloy, is higher than that of cobalt sulfide and nickel sulfide, and battery resistance readily increases. Therefore, in order to fabricate a reliable cell container for positive electrode by a welding method, composition of the Fe alloy used in the fabrication must be restricted exactly to a suitable range. However, the prior art did not consider the above restriction exactly.

SUMMARY OF THE INVENTION

One of the objects of the present invention is to provide a sodium-sulfur battery, which is reliable, scarcely cause deterioration of characteristics with corrosion of the cell container for positive electrode by eliminating the above defects of the prior art.

Another object of the present invention is to provide battery systems using the above sodium-sulfur battery such as reliable power storage equipment, electric vehicles, emergency power supplies, uninterruptible power supplies, peak shift apparatus for electric power systems, frequency-voltage stabilizers, and others.

In order to realize the above objects of the present invention, the sodium-sulfur battery of the present invention comprises a cell container for negative electrode containing sodium, a cell container for positive electrode containing a positive electrode mold composed of sulfur or sodium polysulfide, a sodium ion conductive solid electrolyte separating the negative electrode from the positive electrode, and an insulating member fixed to the cell containers for negative electrode and the positive electrode and connected to the solid electrolyte, wherein the cell container for positive electrode is integrated by welding of plural members which are composed of high corrosion resistant Co base alloys or Ni base alloys containing Cr, and a mechanism for decreasing a stress from the positive electrode mold to the welding portion is provided.

Particularly, the sodium-sulfur battery increases its reliability by providing a readily deforming portion to the cell container for positive electrode.

Cobalt base alloys or Ni base alloys containing Cr are desirable for the cell container for positive electrode, and their preferable range of composition is at least 30 wt. % Co, 18~32 wt. % Cr, and utmost 0.2 wt. % C, or at least 40 wt. % Ni, 18~32 wt. % Cr, and utmost 0.2 wt. % C. These alloys are highly desirable when further contain 3~15 wt. % W, 1~10 wt. % Mo, or 0.2~4 wt. % Al.

Regarding to the material for composing the cell container for positive electrode, an alloy containing Fe as a main component, 22~32 wt. % Cr, and at most 0.2 wt. % C can be used instead of the Co base alloy and the Ni base alloy. The alloy further desirably contains 14~22 wt. % Ni, and preferably contains 23~30 wt. % Cr.

Regarding to Fe alloys, two-phase stainless steel composed of austenite and ferrite, and ferritic stainless steel containing a large amount of Cr can be used. The above Fe alloys preferably further contain 1~10 wt. % Mo.

One of features of the sodium-sulfur battery of the present invention is in composing the cell container for positive electrode with Co base alloy containing Cr and C, or Cr, Ni, and C, further containing W or Mo, wherein plate shape material or pipe shape material of the Co base alloy is treated with an aging treatment to generate a precipitation effect. Therefore, high corrosion resistant $M_6C$ group carbides, or $M_{23}C_6$ group carbides of Cr, W, and Mo are precipitated finely in the base material. Because of high corrosion resistant of the above material in this case, the mechanism or readily deforming portion described previously to decrease stress are not necessarily required. The suitable aging treatment for precipitating the carbides is at a temperature in a range of 500~1000° C. for atleast 10 hours. The Co base alloy desirably contains at least 30 wt. % Co, 18~28 wt. % Cr, and 0.05~0.20 wt. % C, or 18~28 wt. % Cr, 15~25 wt. % Ni, 3~15 wt. % W or Mo, and 0.05~0.20 wt. % C. Further, the Co base alloy can contain at least one element selected from a group consisted of Fe, Si, Mn, and La.

Practically, the following batteries are preferable:

(1) Sodium-sulfur battery using a cell container for positive electrode composed of plates and pipes made of a Co base alloy including Cr and C, or Cr, Ni, and C, and W or Mo, wherein carbide, including at least one element selected from a group consisted of Cr, W, and Mo, is precipitated, (2) Sodium-sulfur battery as described in above paragraph (1), of which contents of Cr and C, or Cr, Ni, and W or Mo, and C in the Co base alloy, wherein carbide including at least one element selected from a group consisted of Cr, W, and Mo, is precipitated, is in a range of 18~28 wt. % Cr, and 0.05~0.20 wt. % C, or 18~28 wt. % Cr, 15~25 wt. % Ni, or 3~15 wt. % W or Mo, and 0.05~0.20 wt. % C, (3) Sodium-sulfur battery as described in above paragraph (1), of which carbide in the Co base alloy, wherein the carbide including at least one element selected from a group consisted of Cr, W, and Mo is precipitated, has a spherical shape of utmost 5 µm in diameter, and an area rate of the carbide is in a range of 20~80%, (4) Sodium-sulfur battery using a cell container for positive electrode composed of a Co base alloy, wherein at least Cr carbide of utmost 5 µm in diameter is precipitated in the Co base alloy by being performed an aging treatment on plates and pipes made of the Co base alloy including Cr and C, or Cr, Ni, and C, and W or Mo at a temperature in a range of 500~1000° C. for at least 10 hours, and (5) Sodium-sulfur battery, wherein a cell container for positive electrode and a cell container for negative electrode are separated by a tube made of beta-alumina group solid electrolyte having a sodium ion conductivity, the cell container for positive electrode contains molten sulfur or a sulfur compound (sodium polysulfide), and the cell container for negative electrode contains molten sodium, further the cell container for positive electrode is composed of a Co base alloy containing the carbide at least one element selected from a group consisted of Cr, and W, and Mo.

Furthermore, the battery systems of the present invention are characterized in power storage equipment, electric vehicles, emergency power supplies, uninterruptible power supplies, peak shaft apparatus for electric power systems, and frequency-voltage stabilizers using the sodium-sulfur battery of the present invention.

In accordance with various investigation performed by the present inventors, it was revealed that an efficiency and a capacitance of a battery was deteriorated by dissolving metallic components of the cell container for positive electrode into the positive electrode mold with progress of corrosion at the welded portion even if the welded portion did not directly contact with the positive electrode mold, and decreasing the stress to the vessel, in addition to increase corrosion resistance by increasing Cr content in the material composing the cell container for positive electrode, was effective to prevent the cell container for positive electrode of the sodium-sulfur battery from corrosion. The reason is considered such that a stable chromium sulfide layer is formed on the surface of the vessel, if a large amount of chromium is contained, and subsequent corrosion can be suppressed, and the stable chromium sulfide layer can be maintained without peeling off, if the stress is small.

The cell container for positive electrode must contain the positive electrode mold inside and be sealed. In consideration of high vapor pressure of sulfur and sodium polysulfide at a high temperature, plurality of members are preferably integrated by welding and sealed, in view of reliability and workability. However, when a metallic material containing a large amount of chromium was used as the material for the positive electrode, it was found that the carbon added to the metallic material, or the carbon contained unavoidably reacted with chromium at the welding operation, and generated carbides were precipitated at the welding portion to cause a residual stress and undesired effects to the corrosion resistance. That means, the metal was heated locally during the welding operation, and various heat treatment of the metal were performed depending on the distance from the welded boundary. As the result, the precipitation condition of the chromium carbides and metallic texture change depending on the location, and the generated heterogeneity in the texture is considered to cause a residual stress. It was revealed that, when elevating temperature and cooling procedure were performed alternately with the cell container for positive electrode having such a residual stress, the chromium sulfide layer formed on the surface of the vessel was readily peeled off by the residual stress in addition to a stress generated from the positive electrode mold by temperature change, and the corrosion resistance was deteriorated. In a case of general welding, the residual stress can be decreased by heat treatment before and/or after the welding. However, in a case of sodium-sulfur battery, the temperature of the heat treatment before and/or after the weld-sealing is restricted because of the vapor pressure and corrosive property of sulfur and sodium polysulfide, and the residual stress can not be decreased thoroughly.

The present invention is considered on the basis of the above findings, and feature of the present invention is explained hereinafter referring to FIGS. 1 and 2.

Figure 1:
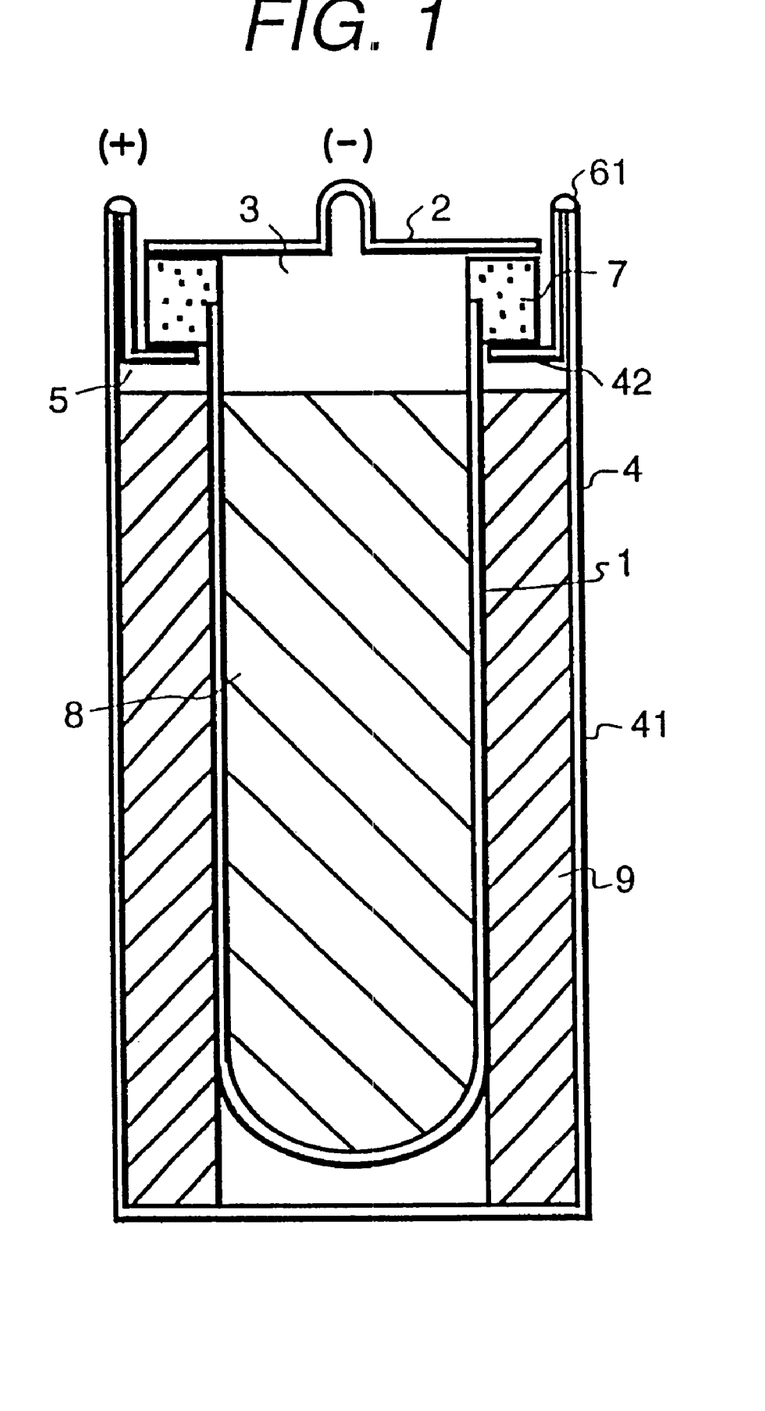
FIG. 1 is a schematic cross section indicating a structure of the battery relating to the present invention.

FIG. 1 is a schematic cross section indicating an example of a structure of the sodium-sulfur battery relating to the present invention. The numeral 1 in FIG. 1 indicates a tube of sodium ion conductive solid electrolyte, 2 is a cell container for negative electrode composing a negative electrode chamber 3 with the tube of the solid electrolyte 1, and 41, 42 are members of the cell container for positive electrode 4 composing a positive electrode chamber 5 with the tube of the solid electrolyte 1. The numeral 61 indicates a welded portion of the members 41, 42. The numeral 7 indicates an insulator which is insulating the cell container for negative electrode 2 from the cell container for positive electrode 4, and connected to both of the above vessels. Generally, the insulator 7 and the opening of the tube of the solid electrolyte 1 is mutually adhered by glass soldering or other methods. The numeral 8 indicates sodium contained in the negative electrode chamber 3, 9 is a positive electrode mold composed of sulfur and sodium polysulfide, which is generally impregnated into carbon fiber and others, and contained in the positive electrode chamber 5.

Figure 2:
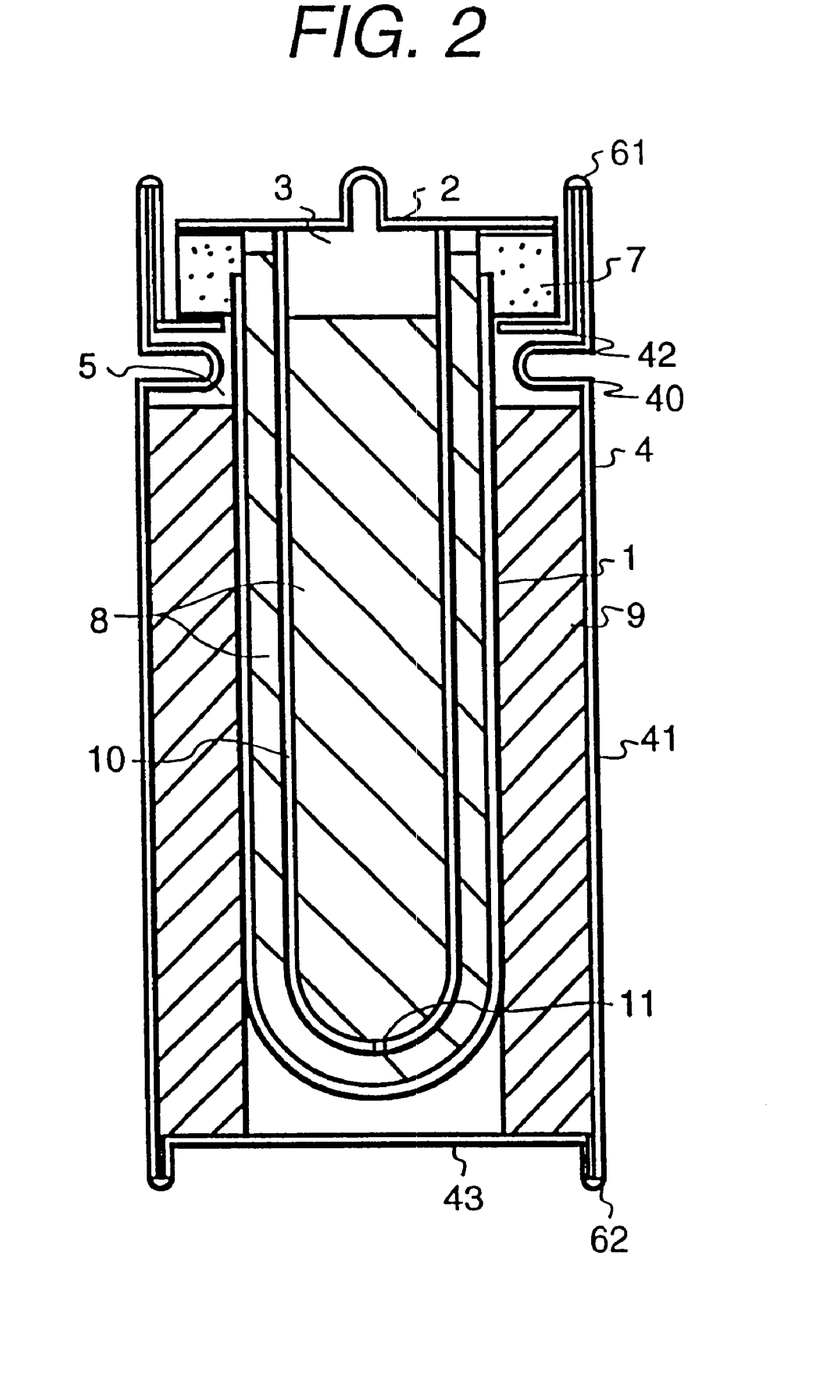
FIG. 2 is another schematic cross section indicating a structure of the battery relating to the present invention.

Referring to FIG. 2, the members assigned with the same numbers as FIG. 1 have the same meanings as FIG. 1. The numeral 43 in FIG. 2 indicates a member to compose the cell container for positive electrode 4, and the member 43 is connected to the member 41 at the welded portion 62. The numeral 40 indicates an readily deforming portion such as bellows provided to the cell container for positive electrode 4. The numeral 10 indicates a sodium vessel provided in the cell container for negative electrode chamber 3, and sodium 8 is supplied into the solid electrolyte tube 1 through a through hole 11.

Regarding to the above structure, the members 41, 42, 43 of the cell container for positive electrode are composed of a high corrosion resistant metallic material containing a large amount of Cr, and integrated by welding. The member 42 locates inside the member 41, and restricts inward deformation of the member 41, which is caused by elongation and shrinkage of the positive electrode mold by elevating temperature or cooling, and change in volume with phase change of sodium polysulfide, in order to decrease the stress added to the welded portion 61. The same effect can also be achieved with the member 43 by restricting the inward deformation of the member 41 in order to decrease the stress added to the welded portion 62. Further, the stress added to the welded portion 61, 62 also can be decreased by restricting the outward deformation of the cell container for positive electrode by providing a rigid ring (not shown in the figure) at a lower outside position of the welded portion 61 or an upper outside position of the welded portion 62 of the cell container for positive electrode.

The member 42 has a L-letter shape in its cross section, and the member 42 is readily deformed in its angle of the L-shape to absorb a difference in thermal shrinkage of the tube of the solid electrolyte 1 and the cell container for positive electrode 4 after the positive electrode mold solidified. Therefore, further decrease of the stress to the welded portion 61 added by elevating temperature and cooling can be realized. The same effect can be observed by providing bellows 40 to the cell container for positive electrode, and a significant decrease of the stress added to the welded portion 61 can be realized by deformation of the bellows. The above bellows 40 and the member 42 are preferably provided at a position where the bellows and the member do not touch with the positive electrode mold 9. If the bellows and the member touch with the positive electrode mold 9, the deformation of the bellows and the other members are restricted by the solidified positive electrode mold, and the effect to decrease the stress by the deformation is reduced.

In accordance with the present invention, the chromium sulfide layer formed on the surface of the vessel can be maintained, even if the residual stress is generated by the precipitation of chromium carbides during the welding of the members which are composed of a high corrosion resistant metallic material containing a large amount of chromium, because the stress added to the welded portion is small. As the result, corrosion resistance of the cell container for positive electrode can be maintained at a high level, and reliability of the sodium-sulfur battery can be significantly improved. The material composing the cell container for positive electrode must have a preferable workability and weldability in addition to the preferable corrosion resistance. If the above condition is not satisfied, the preferably reliable battery can not be obtained. For instance, if a material of poor corrosion resistance such as a Fe alloy containing a small amount of Cr, or a coated material are used as the material for the tube of positive electrode, the objective effect can not be realized by deficiency of the corrosion resistance of the material itself and the welded portion. Further, the material which readily generates residual stress at the welded portion is undesirable, because the chromium sulfide layer formed on the surface of the vessel can not be maintained stable.

The material for composing the cell container for positive electrode of the present invention is preferably a Co base alloy or a Ni base alloy. The above alloys are advantageous, because the above alloys have a smaller residual stress generated during welding and a larger corrosion resistance in comparison with Fe alloys which are conventionally used.

Another advantage is that the electrical resistance of the sulfides formed on the surface of the vessel is smaller than that of the Fe alloy, and accordingly, the characteristics of the battery is stable, and the reliability of the battery is further improved. Particularly, in the case using a Co base alloy, the solubility of formed cobalt sulfide in sodium polysulfide is smaller than that of nickel sulfide, and accordingly, the reliability of the battery can be particularly improved.

A preferable range of composition of respective of the Co base alloy and the Ni base alloy is at least 30 wt. % Co, 18~32 wt. % Cr, and at most 0.2 wt. % C, or at least 40 wt. % Ni, 18~32 wt. % Cr, and at most 0.2 wt. % C. If the content of Co or Ni is less than the above range, the advantages of the Co base alloy or the Ni base alloy is reduced. If the content of Cr is less than the above range, corrosion resistance is decreased. On the contrary, if the content of Cr is more than the above range, fabrication to the cell container for positive electrode becomes difficult. If the content of C is more than the above range, not only fabrication to the cell container for positive electrode becomes difficult, but also corrosion resistance is decreased, because the amount of precipitated chromium carbide during welding increases and the residual stress increases. If respective of the Co base alloy and the Ni base alloy contains 3~15 wt. % W, 1~10 wt. % Mo, or 0.2~4 wt. % Al, the alloys are particularly preferable because the corrosion resistance further increases. If the contents of W, Mo, and Al are smaller than the above range, the effect of the addition can not be sufficiently obtained, and if larger than the above range, fabrication to the cell container for positive electrode becomes difficult.

As for the material composing the cell container for positive electrode of the present invention, a Fe alloy composed of Fe as a main component, 22~32 wt. % Cr, and at most 0.2 wt. % C, can be used. If the content of Cr is smaller than the above range, the corrosion resistance decreases, and if the content of Cr is larger than the above range, the fabrication to the cell container for positive electrode becomes difficult. If the content of C is more than the above range, not only fabrication to the cell container for positive electrode becomes difficult, but also corrosion resistance is decreased, because the amount of precipitated chromium carbide during welding increases and the residual stress increases. If the Fe alloy contains 14~24 wt. % Ni, additional advantages, such as decreasing the residual stress generated during the welding and improving the corrosion resistance, are realized. Use of two phase stainless steel composed of austenite and ferrite as the Fe alloy is also effective for decreasing the residual stress and improving the corrosion resistance. When the two phase stainless steel or the ferritic stainless steel is used, advantages such that, thermal expansion becomes smaller than a case when austenitic stainless steel is used, and accordingly, a thermal strain is hardly added. to the welded portion, can be realized. The content of 23~30 wt. % Cr is desirable for making corrosion resistance and workability compatible, particularly preferable in practical use. Another advantage such as improvement in corrosion resistance against sulfur without harming workability can be realized with the Fe alloy by containing 1~10 wt. % Mo.

Practically, SUS 310S (24~26wt. % Cr, 19~22 wt. % Ni, balance Fe), SUS 329J (23~28 wt. % Cr, 3~6 wt. % Ni, 3 wt. % Mo, balance Fe), SUS 427J (28.5~32 wt. % Cr, 2 wt. % Mo, balance Fe), and the like can be used.

As a result of investigation by the present inventors, it was revealed that a reliable sodium-sulfur battery could be obtained by using a cell container for positive electrode composed of a Co base alloy, which was manufactured by performing a solution heat treatment on materials of plates and pipes which are composed of a Co base alloy containing Cr and C, or Cr, Ni, W or Mo, and C of an appropriate range in composition, and subsequently, precipitating fine $M_6C$, $M_{23}C_6$ group carbides of at least Cr, W, and Mo by an aging heat treatment, without being provided the stress reducing mechanism or the readily deforming portion of the cell container for positive electrode, because of significantly improved corrosion resistance. In this case, plastic working to form pipes is facilitated, and additionally, weldability is improved and fabrication of the cell container for positive electrode becomes easy.

The cell container for positive electrode manufactured by the above process can be improved significantly in reliability in comparison with the one having a corrosion resistant coating, because the base material itself has preferable corrosion resistance. The Co base alloy of the present invention, wherein fine $M_6C$, $M_{23}C_6$ group carbides of at least Cr, W, and Mo are precipitated in a matrix of a Co base alloy containing Cr and C, or Cr, Ni, W or Mo, and C, is superior in not only corrosion resistance, but also advantageous in preventing decrease of an efficiency of the battery , because electric resistance of cobalt sulfide formed on surface of the alloy by a reaction with sulfur is low. The desirable ranges of composition of the material for the Co base alloy, when the above $M_6C$, $M_{23}C_6$ group carbides are precipitated, are at least 30 wt. % Co, 0.50~0.20 wt. % C, 18~28 wt. % Cr, desirably 15~25 wt. % Ni, and 3~15 wt. % W or Mo. The ranges of composition of the alloy were restricted by the following reason:

Carbon (C) in the Co base alloy of the present invention forms a solid solution in Co when melted and stabilize austenitic phase, but C forms fine $M_6C$, $M_{23}C_6$ group carbides by the aging heat treatment after the solution heat treatment. Therefore, C contributes to improving mechanical strength in addition to improving corrosion resistance. However, if the amount of C is excessive, C combines to form large grains of the above carbides to decrease ductility and disturb hot forging operation. Therefore, the C content must be restricted to a range of 0.05~0.20 wt. %. A larger amount of Cr improves corrosion resistance and strength by precipitating Cr carbide, or complex carbides of Cr, W, and Mo, decreases ductility. Furthermore, hot forging operation becomes difficult. Therefore, the Cr content must be restricted to a range of 18~28 wt. %. Tungsten (W) or molybdenum (Mo) contributes to precipitate fine $M_6C$, $M_{23}C_6$ group carbides by an aging heat treatment, and W or Mo is effective in improving corrosion resistance. However, if W or Mo is excessive, workability is decreased. Accordingly, the content of W or Mo must be restricted to a range of 3~15 wt. %. Nickel (Ni) contributes to form an austenitic structure, which is superior in strength and corrosion resistance, in the alloy. In order to form the austenitic structure, coexisting at least 15 wt. % Ni and at least 18 wt. % Cr is necessary. However, if Ni is excessive, Ni forms an intermetallic compound with Co to be brittle. The Co base alloy containing Cr, Ni, and W or Mo, and C of the present invention can contain at least one element selected from a group consisted of Si, Mn, and La. Iron (Fe) is contained in the alloy as an impurity. However, if the content of Fe is excessive, corrosion resistance of the alloy is decreased significantly. Therefore, the content of Fe is desirably restricted to utmost 4 wt. %. Silicon (Si) is added to the alloy in a melting operation as a deoxidizing agent, and effective in improving oxidation resistant property of the alloy.

However, if Si exists excessively, toughness and hot workability of the alloy are decreased. Therefore, the content of Si is desirably restricted to utmost 0.4 wt. %. Manganese (Mn) is added to the alloy as a deoxidizing agent as well as Si, and additionally, Mn increases solid solubility of the additive elements by coexisting with Ni to help precipitating desirable carbides, improving corrosion resistance, toughness, and hot workability. However, when the content of Mn increases, the molten alloy corrodes ladle bricks in a melting operation, and contamination of the alloy with impurities causes readily. Therefore, the content of Mn is desirably restricted to utmost 1.5 wt. %. Lanthanum (La) has an effect to make the alloy passive and increase corrosion resistance. However, if La exists excessively, hot workability of the alloy is disturbed. Therefore, the content of La is desirably restricted to a range of 0.01~0.10 wt. %. The aging heat treatment under 500° C. does not have any effect to precipitate the above carbides. If the temperature of the aging heat treatment exceeds 1000° C., the carbides grow to be coarse. Accordingly, decreasing the corrosion resistance and lowering the strength are caused. In view of the above reason, the condition of the aging heat treatment is desirably determined to be a temperature in a range of 500~1000° C., and a time at least 10 hours. In accordance with the present invention, the above carbides are fine and spherical, which is preferable for improving straight. However, the size of the carbide precipitated in the mother material of the alloy is desirably restricted to utmost 5 μm, and the area ratio is desirably restricted to a range of 20~80%. The reason is as follows; if the size of the carbide exceeds 5 μm, the alloy becomes brittle and plastic workability is disturbed. If the area ratio is smaller than 20%, improvement in corrosion resistance is not realized. If the area ratio exceeds 80%, the corrosion resistance can be improved, but the alloy becomes brittle and loses ductility, and plastic workability is disturbed. The area ratio of the carbide precipitated in the mother material can be controlled by varying the additive amount of carbon, and the temperature and time of the aging heat treatment. That means, in order to reduce the area ratio of the carbide, the additive amount of carbon is decreased, the temperature of the aging heat treatment is lowered, and the time of the aging heat treatment is shortened. On the contrary, increase of the area ratio of the carbide can be realized by increasing the additive amount of carbon, elevating the temperature of the aging heat treatment, and extending the time of the aging heat treatment long.

In accordance with using the sodium-sulfur battery relating to the present invention, reliability of a battery system can be improved, and highly reliable power storage equipment, electric vehicles, emergency power supplies, uninterruptible power supplies, peak shift apparatus for electric power systems, frequency-voltage stabilizers, and others can be realized.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Hereinafter, embodiments of the present invention are explained referring to drawings.

Embodiment 1

Practically, a solid electrolyte tube shown in FIG. 2, which was made of lithium doped β"-alumina sintered body, was used as the solid electrolyte tube 1. Then, α-alumina, an insulator 7, was fixed to the solid electrolyte tube 1 by glass bonding, and the insulator, a cell container for negative electrode 2, and a member 42 of a cell container for positive electrode were joined by thermo-compression bonding using aluminum-silicon-magnesium group alloy foil. The negative electrode vessel 2 and a sodium vessel 10 were made of SUS 304 stainless steel. The sodium vessel containing sodium 8 and nitrogen gas of about 0.1 atmosphere was sealed so that the sodium would leak outside through a small hole 11 of 0.2 mm in diameter located at the lower portion of the sodium vessel to cover the inner surface of the solid electrolyte tube. On the other hand, members 41, 42, 43, made of the materials shown in Table 1, to compose the cell container for positive electrode were integrated by TIG welding or electronic beam welding. The sodium-sulfur battery having the structure shown in FIG. 2 was obtained by loading the cell container for positive electrode with a positive electrode mold composed of sulfur and carbon fiber mat, filling with nitrogen gas of about 0.1 atmosphere, and sealing with a bottom lid (the member shown by 43 in FIG. 2) by TIG welding under reduced pressure. The size of the cell container for positive electrode was about 65 mm in diameter, and about 1.5 mm thick. Rigidity in an axial direction of the bellows 40 provided to the cell container for positive electrode was about 10 N/mm.

Figure 3:
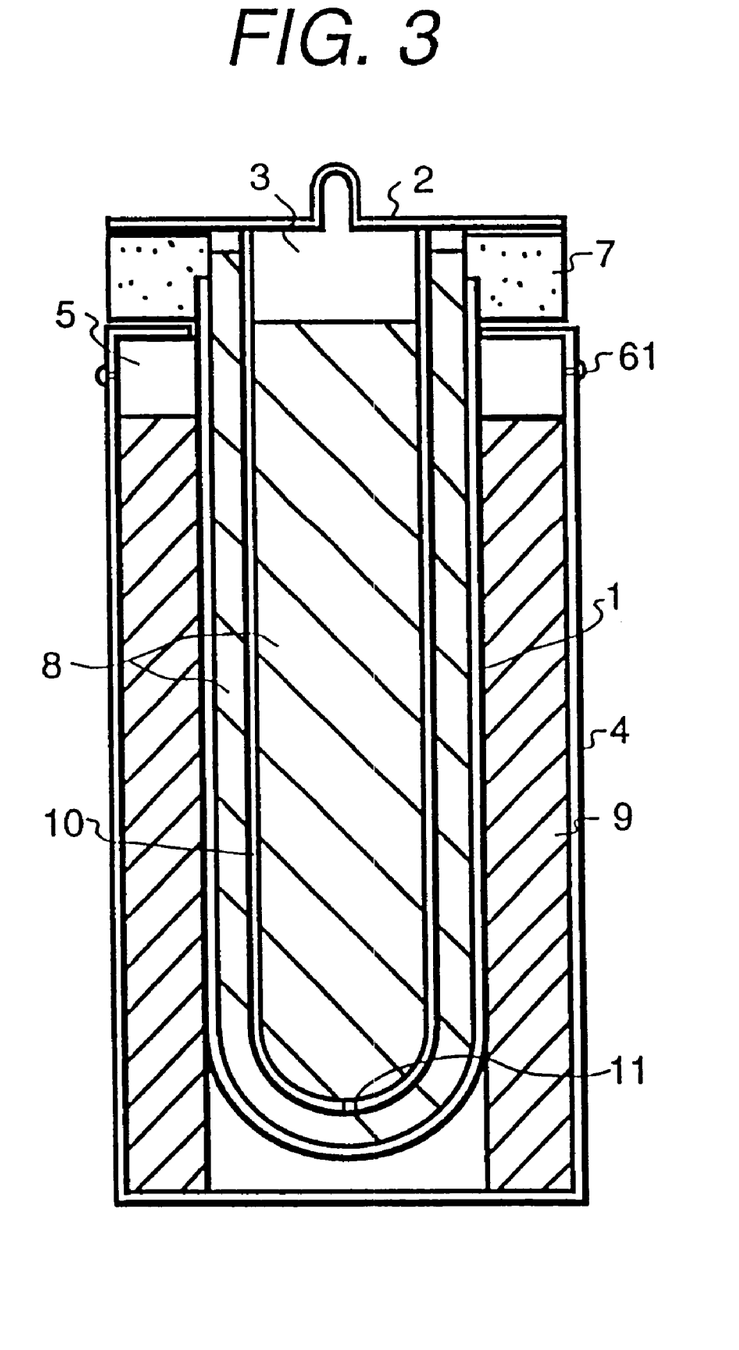
FIG. 3 is a schematic cross section indicating a a structure of the battery relating to the comparative example.

In accordance with the same method, a battery having a structure shown in FIG. 1 provided with the same sodium vessel as the one shown in FIG. 2, and a battery having a structure shown in FIG. 3 as a comparative example, were manufactured. Rigidity in an axial direction of the cell container for positive electrode shown in FIG. 1, which was not provided with the bellows, was about 25 N/mm, and Rigidity in an axial direction of the cell container for positive electrode shown in FIG. 3 was about 150 N/mm. The respective batteries was repeatedly charged and discharged 500 times with a current density of 200 mA/cm$^2$ per current-carrying area of the solid electrolyte tube at 400° C., and the batteries were repeatedly heated and cooled in a range from room temperature to 400° C. 20 times during the above requested charge and discharge, and the efficiencies of the batteries and the change rate in capacitance, were observed. The results are shown in Table 1.

TABLE 1

| | Structure | | Composition (wt. %) | | | |
|---|---|---|---|---|---|---|
| Sample | Drawing | Bellows | Cr | Co | Ni | Fe |
| 1 | FIG. 2 | yes | 22 | 39 | 22 | 3 |
| 2 | 1 | no | 22 | 39 | 22 | 3 |
| 3 | 2 | yes | 19 | 71 | — | — |
| 4 | 2 | yes | 28 | 51 | — | 20 |
| 5 | 2 | yes | 22 | 1.5 | 47 | 19 |
| 6 | 1 | no | 22 | 1.5 | 47 | 19 |
| 7 | 2 | yes | 20 | — | 68 | 2.5 |
| 8 | 2 | yes | 30 | 2 | 43 | 15 |
| 9 | 2 | yes | 19 | 14 | 57 | 0.3 |
| 10 | 2 | yes | 25 | — | 20 | 54 |
| 11 | 1 | no | 24 | — | 5 | 67 |
| 12 | 2 | yes | 30 | — | — | 67 |

TABLE 1-continued

| Comparative example | | | | | | |
|---|---|---|---|---|---|---|
| C-1 | 3 | no | 22 | 39 | 22 | 3 |
| C-2 | 3 | no | 22 | 2.5 | 46 | 20 |
| C-3 | 3 | no | 19 | — | 9 | 72 |
| C-4 | 2 | yes | 19 | — | 9 | 72 |

| | Composition (wt. %) | | | | Efficiency, Change rate | Capacitance, Change rate |
|---|---|---|---|---|---|---|
| Sample | C | Mo | W | Al | | |
| 1 | 0.1 | — | 14 | — | ◉ | ◉ |
| 2 | 0.1 | — | 14 | — | ◉ | ○ |
| 3 | 0.2 | — | 5 | 4 | ◉ | ◉ |
| 4 | 0.02 | — | — | — | ◉ | ◉ |
| 5 | 0.1 | 9 | 0.6 | — | ◉ | ◉ |
| 6 | 0.1 | 9 | 0.6 | — | ◉ | ○ |
| 7 | 0.05 | 9 | — | 0.2 | ◉ | ◉ |
| 8 | 0.03 | 6.5 | 3 | — | ◉ | ◉ |
| 9 | 0.05 | 7 | — | 2 | ◉ | ◉ |
| 10 | 0.08 | — | — | — | ○ | ○ |
| 11 | 0.12 | 3 | — | 3 | ○ | ○ |
| 12 | 0.005 | 2 | — | — | ○ | ○ |
| Comparative example | | | | | | |
| C-1 | 0.1 | — | 14 | — | Δ | Δ |
| C-2 | 0.05 | 8 | 1 | — | Δ | X |
| C-3 | 0.08 | — | — | — | X | X |
| C-4 | 0.08 | — | — | 5 | Δ | X |

Remarks:
Change rate; ◉: 0~1%, ○: 2~3%, Δ: 5~10%, X: more than 10%

In accordance with the results shown in Table 1, it is clearly revealed that the sodium-sulfur battery of the present invention has a stable characteristics and a high reliability. The sample shown in Table 1 as the comparative example C-1 was not treated with the aging heat treatment, which were performed on the samples of Embodiment 2.

Embodiment 2

An alloy consisted of a composition such as 0.01~0.30 wt. % C, 15~35 wt. % Cr, 10~30 wt. % Ni, 1~20 wt. % W., 1~16 wt. % Mo, and balance of Co, was melted in a crucible under an inert gas atmosphere. Subsequently, the obtained alloy was forged at a temperature of 1000~1200° C. to form a sample of 15 mm thick, 200 mm wide, and 400 mm long, in order to evaluate hot workability of the alloy it self. The result is shown in Table 2. The table 2 reveals that the Co base alloy generates no cracks in the sample, and realizes a preferable platic workability with a composition in a range of utmost 0.20 wt. % C, utmost 28 wt. % Cr, utmost 25 wt. % Ni, utmost 15 wt. % W, and utmost 15 wt. % Mo in the Co base alloy.

TABLE 2

| Sample No. | Alloy composition (wt. %) | | | | | | Workability | Corrosion resistance |
|---|---|---|---|---|---|---|---|---|
| | C | Cr | Ni | W | Mo | Co | | |
| 1 | 0.01 | 22 | 22 | 14 | — | Bal. | ◉ | ○ |
| 2 | 0.05 | 22 | 22 | 15 | — | Bal. | ◉ | ◉ |
| 3 | 0.10 | 22 | 22 | 15 | — | Bal. | ◉ | ◉ |
| 4 | 0.20 | 22 | 22 | — | 14 | Bal. | ◉ | ◉ |
| 5 | 0.30 | 22 | 22 | 14 | — | Bal. | ○ | ◉ |
| 6 | 0.10 | 28 | 23 | 14 | — | Bal. | ◉ | ◉ |
| 7 | 0.10 | 35 | 22 | — | 14 | Bal. | ○ | ◉ |
| 8 | 0.10 | 22 | 22 | — | 16 | Bal. | ○ | ◉ |
| 9 | 0.10 | 22 | 27 | 14 | — | Bal. | ○ | ◉ |
| 10 | 0.10 | 22 | 30 | 14 | — | Bal. | ○ | ◉ |
| 11 | 0.10 | 22 | 22 | 20 | — | Bal. | ○ | ◉ |
| 12 | 0.10 | 18 | 22 | 14 | — | Bal. | ◉ | ◉ |
| 13 | 0.10 | 15 | 22 | 14 | — | Bal. | ◉ | ◉ |
| 14 | 0.10 | 22 | 15 | 14 | — | Bal. | ◉ | ◉ |
| 15 | 0.10 | 22 | 10 | 14 | — | Bal. | ◉ | ○ |
| 16 | 0.10 | 22 | 22 | 5 | 1 | Bal. | ◉ | ◉ |
| 17 | 0.10 | 22 | 22 | 1 | 3 | Bal. | ◉ | ◉ |

Remarks: ◉: Excellent, ○: Good

The obtained alloy was heated to 1180° C. under an inert gas atmosphere for the solution treatment, and subsequently, heated to 700° C. for 100 hours for the aging heat treatment. First, a precipitation feature of the carbides of the sample was observed by metallographic examination, and then corrosion resistance was evaluated. The metallographic examination was held by the steps of polishing the sample, etching the polished sample with aqua regia, and observing with a scanning electron microscope. The corrosion test was performed by immersing the sample into molten $Na_2S_4$ at 400° C. for 1000 hours. The results of the corrosion tests are shown in Table 2.

The alloy of the present invention consisted of 0.05~0.20 wt. % C, 18~28 wt. % Cr, 15~25 wt. % Ni, 3~15 wt. % W, 3~15 wt. % Mo, and balance of Co, and treated with an aging treatment was confirmed to form fine $M_6C$, $M_{23}C_6$ group carbides, smaller than 2 μm in diameter, of W, Mo, and Cr precipitated in a matrix of a Co base alloy. The amount of corrosion was less than 0.3 mg/cm$^2$ for all samples, and it was confirmed that the alloy was significantly corrosion resistant even at a high temperature such as 400° C.

Embodiment 3

A Co base alloy having a composition of 0.1 wt. % C, 0.05 wt. % La, 22 wt. % Cr, 22 wt. % Ni, 14 wt. % W, utmost 1,5 wt. % Fe, and balance of Co, (Commercial name HA-188), was treated for solution heat treatment by 1180° C.×1 hour, and formed a plate of 1.5 mm thick, 210 mm wide, and 400 mm long by cold rolling. Subsequently, an aging heat treatment was performed on the alloy at 500° C., 850° C., and 1000° C. for 500 hours under an inert gas atmosphere. The structures of the above alloys treated with the aging heat treatment and alloys treated only with the solution heat treatment were observed by a scanning electron microscope.

As the result, the alloy treated with the aging heat treatment at a temperature in a range of 500~1000° C. was confirmed to form fine $M_6C$, $M_{23}C_6$ group carbides, smaller than 2 μm in diameter, of W and Cr precipitated in austenite. On the contrary, formation of the carbides was hardly observed in the alloy treated only with the solution heat treatment.

Mechanical properties of the obtained alloys treated with the aging heat treatment at 850° C., and the alloy treated with the solution heat treatment were determined. As the result, the alloy treated with the aging heat treatment having a composition of 0.1 wt. % C, 0.05 wt. % La, 22 wt. % Cr, 22 wt. % Ni, 14 wt. % W, utmost 1,5 wt. % Fe, and balance of Co, was 100 kg/mm² in tensile strength, 56 kg/mm² in 0.2% yield strength, and 50% in elongation. The alloy treated only with the solution heat treatment was 95 kg/mm² in tensile strength, 55 kg/mm² in 0.2% yield strength, and 56% in elongation. In accordance with the above observation, it was confirmed that the alloy of the present invention, which was treated with the aging heat treatment and precipitated with carbides of W and Cr, had a relatively high strength, and a preferable ductility.

Furthermore, a plate made of the alloy, which was treated with the same aging heat treatment as above and consisted of a composition of 0.1 wt. % C, 0.05 wt. % La, 22 wt. % Cr, 22 wt. % Ni, 14 wt. % W, utmost 1,5 wt. % Fe, and balance of Co, was welded with a TIG welding method. In accordance with observation of the structure of the welded portion, integrity of the welded portion was confirmed, and the alloy of the present invention was confirmed to have preferable weldability.

Corrosion tests were performed on the alloys obtained by the present embodiment, which were the alloys treated with the aging heat treatment, and the alloy treated only with the solution heat treatment, and their corrosion resistance were evaluated. In order to compare with the above samples, the same corrosion test as above was performed on a sample which was made of a conventional Al substrate, whereon stelite powder consisted of 28 wt. % Cr, 67 wt. % Co, 1 wt. % C, and 4 wt. % W, was plasma sprayed. The corrosion test was performed by immersing the sample into molten $Na_2S_4$ at 350° C., 400° C. for 1000 hours. The results of the corrosion tests are shown in Table 3.

TABLE 3

| Material of cell container for positive electrode | Reduced amount by corrosion (mg/cm²) | | Reduced thickness by corrosion (μm) | | | |
|---|---|---|---|---|---|---|
| | | | 350° C. | | 400° C. | |
| | 350° C. | 400° C. | 1 year | 10 years | 1 year | 10 years |
| The alloy of the present invention, aging treatment | 0 | 0.25 | — | — | 2.4 | 24 |
| The comparative sample, solution treatment | 0 | 0.40 | — | — | 4.0 | 40 |
| Conventional plasma sprayed material | 0.7 | 4.0 | 0.8 | 8 | 40 | 400 |

The alloys obtained by the present embodiment, which were the alloys treated with the aging heat treatment, and the alloy treated only with the solution heat treatment, were not corroded at a low temperature as 350° C., for 1000 hours. Reduced amount by corrosion at a high temperature as 400° C., for 1000 hours of the alloys of the present invention, which were the alloys treated with the aging heat treatment, and the alloy treated only with the solution heat treatment, were 0.25 mg/cm², and 0.40 mg/cm², respectively. Therefore, the alloy of the present invention treated with the aging heat treatment was confirmed to have a preferable corrosion resistance even at a high temperature.

If the alloy of the present invention treated with the aging heat treatment is corroded with a constant velocity continuously during one year, a thickness reduction by corrosion, that is a reduced thickness, of the alloy treated with the aging heat treatment can be assumed to be 2.4 μm. The case of the alloy treated only with the solution heat treatment can be assumed to be 4 μm. By simply multiplying these values with the duration time of the battery, i.e. 10 years, the reduced thickness of the alloy treated with the aging heat treatment becomes 24 μm, and of the alloy treated only with the solution heat treatment becomes 40 μm. Therefore, the necessary thickness for the duration time of the battery, i.e. 10 years, can be sufficiently given by taking about 36 μm thick of the alloy of the present invention treated with the aging heat treatment even if taking a safety factor of 1.5. Furthermore, in consideration that the positive electrode of the battery is actually corroded during a charging time of the battery and an unoperated time at a high temperature, the necessary thickness can be thinner than the above value. On the contrary, the alloy treated only with the solution heat treatment requires about 60 μm. In comparison with the above alloys, the conventional Al substrate, whereon stelite powder was plasma sprayed, reduced its weight by 0.7 mg/cm² even at a low temperature as 350° C. for 1000 hours. The thickness reduction of the Al substrate by corrosion with a constant velosity continuously during one year was 0.8 μm. The reduced amount by corrosion at a high temperature as 400° C. for 1000 hours of the Al substrate was 4 mg/cm², and the thickness reduction of the Al substrate by corrosion during one year was 40 μm. By multiplying these values with the duration time of the battery, the reduced thickness of the test piece becomes about 8 μm at 350° C. and about 400 μm at 400° C. Therefore, it is revealed that the conventional Al substrate, whereon stelite powder is plasma sprayed, is readily corroded, especially at a high temperature as 400° C.

In accordance with the present invention, the corroded amount of the material for the cell container for positive electrode of the battery is small, and a problem to lower the efficiency of the battery can be eliminated.

Embodiment 4

An alloy consisted of 0.1 wt. % C, 20 wt. % Cr, and balance of Co was melted in an inert gas atmosphere. The alloy was heated at 1180° C. for one hour as a solution heat treatment, and cold rolled to form a plate of 1.5 mm thick, 210 mm wide, and 400 mm long. Subsequently, the alloy was heated at 850° C. for 500 hours as an aging heat treatment. Structure observation with a scanning electron microscope and a corrosion test were performed on the alloy obtained by the aging heat treatment. The corrosion test was performed by immersing the sample into molten $Na_2S_4$ at 400° C. for 1000 hours as same as the above embodiment.

As the result of the structure observation and the corrosion test, forming the fine $M_6C$, $M_{23}C_6$ group carbides, smaller than 2 μm in diameter, in the alloy was confirmed, the amount of corrosion was 0.3 mg/cm², and the alloy was confirmed to have a desirable corrosion resistance even at a high temperature as 400° C.

Because of the stable characteristics and the high reliability of the sodium-sulfur battery of the present invention, a battery system composed of a plurality of the sodium-sulfur batteries of the present invention has also a high reliability, and highly reliable power storage equipment, electric vehicles, emergency power supplies, uninterruptible power supplies, peak shift apparatus for electric power systems, frequency-voltage stabilizers, and others can be realized by using the above battery system.

In accordance with the present invention, deterioration of characteristics of the battery is hardly occurred, reliability of the battery is significantly increased, and the duration time of the battery can be extended. Further, the material for the cell container for positive electrode has a preferable plastic workability, and manufacturing process of the vessel can be simplified.

What is claimed is:

1. A sodium-sulfur battery comprising:
   a cell container for a positive electrode, composed of materials in plate-shape and pipe-shape, said materials being a Co base alloy containing Cr and C, and having Cr carbides precipitated in said alloy.

2. A sodium-sulfur battery as claimed in claim 1, wherein said Co base alloy, wherein Cr carbide is precipitated, contains at least 30 wt. % Co, 18~28 wt. % Cr, and 0.05~0.2 wt. % C.

3. A sodium-sulfur battery as claimed in claim 2, wherein said Co base alloy contains at least one element selected from the group consisting of W, Mo, Ni, Fe, Si, Mn and La.

4. A sodium-sulfur battery as claimed in claim 3, wherein said Co base alloy contains 3~15 wt. % W or Mo, and carbides containing at least one of W, Mo, and Cr, which are precipitated in said alloy.

5. A sodium-sulfur battery as claimed in claim 1, wherein said carbides of at least one of W, Mo, and Cr in said Co base alloy have a spherical shape, a particle diameter of utmost 5 $\mu$m, and an area ratio of 20~80%.

6. A battery system including one of a reliable power storage device, a power supply for an electric vehicle, an emergency power supply, an uninterruptible power supply, a peak shift apparatus for an electric power system, and a frequency-voltage stabilizer, wherein
   said sodium-sulfur battery as claimed in claim 1 is used.

7. A sodium-sulfur battery comprising:
   a $\beta$-alumina group solid electrolyte having sodium ion conductivity, which separates a cell container for a negative electrode and a cell container for a positive electrode,
   said cell container for the positive electrode containing molten sulfur or a sulfur compound (sodium polysulfide), and
   said cell container for the negative electrode containing molten sodium, wherein
      said cell container for the positive electrode is made of said Co base alloy of claim 1.

8. A battery system including one of a reliable power storage device, a power supply for an electric vehicle, an emergency power supply, an uninterruptible power supply, a peak shift apparatus for an electric power system, and a frequency-voltage stabilizer, wherein
   said sodium-sulfur battery as claimed in claim 7 is used.

9. A sodium-sulfur battery as claimed in claim 11, wherein said carbides in said Co base alloy have a spherical shape, a particle diameter of utmost 5 $\mu$m, and an area ratio of 20~80%.

10. A sodium-sulfur battery comprising:
    a cell container for a positive electrode, composed of
    materials in plate shape and pipe-shape, said materials (1) being a Co base alloy, which contains Cr, Ni, C, and W or Mo, and
    (2) having carbides containing at least one of W, Mo, and Cr, which are precipitated in said alloy.

11. A sodium-sulfur battery as claimed in claim 1, wherein said Co base alloy, wherein carbides of at least one of W, Mo, and Cr are precipitated, contains 18~28 wt. % Cr, 15~25 wt. % Ni, 3~15 wt. % W or Mo, and 0.05~0.2 wt. % C.

12. A battery system including one of a reliable power storage device, a power supply for an electric vehicle, an emergency power supply, an uninterruptible power supply, a peak shift apparatus for an electric power system, and a frequency-voltage stabilizer, wherein
    said sodium-sulfur battery as claimed in claim 10 is used.

13. A sodium-sulfur battery comprising:
    a $\beta$-alumina group solid electrolyte having sodium ion conductivity, which separates a cell container for a negative electrode and a cell container for a positive electrode,
    said cell container for the positive electrode containing molten sulfur or a sulfur compound (sodium polysulfide), and
    said cell container for the negative electrode containing molten sodium, wherein
       said cell container for the positive electrode is made of said Co base alloy of claim 10.

14. A battery system including one of a reliable power storage device, a power supply for an electric vehicle, an emergency power supply, an uninterruptible power supply, a peak shift apparatus for an electric power system, and a frequency-voltage stabilizer, wherein
    said sodium-sulfur battery as claimed in claim 13 is used.

15. A sodium-sulfur battery comprising
    a cell container for positive electrode, composed of materials in plate-shape and pipes which are made of a Co base alloy, which contains (1) Cr and C, or (2) Cr, Ni, C, and W or Mo, wherein at least Cr carbide having utmost 5 $\mu$m in diameter is precipitated by heating at 500~1000° C. for 10 hours as an aging heat treatment.

16. A sodium-sulfur battery comprising.
    a $\beta$-alumina group solid electrolyte having sodium ion conductivity, which separates a cell container for a negative electrode and a cell container for a positive electrode,
    said cell container for the positive electrode containing molten sulfur or a sulfur compound (sodium polysulfide), and
    said cell container for the negative electrode containing molten sodium, wherein
       said cell container for the positive electrode is made of said Co base alloy.

17. A battery system including one of a reliable power storage device, a power supply for an electric vehicle, an emergency power supply, an uninterruptible power supply, a peak shift apparatus for an electric power system, and a frequency-voltage stabilizer, wherein
    said sodium-sulfur battery as claimed in claim 16 is used.

18. A battery system including one of a reliable power storage device, a power supply for an electric vehicle, an emergency power supply, an uninterruptible power supply, a peak shift apparatus for an electric power system, and a frequency-voltage stabilizer, wherein
    said sodium-sulfur battery as claimed in claim 15 is used.

* * * * *